United States Patent [19]

Polley

[11] 4,452,306

[45] Jun. 5, 1984

[54] APPARATUS FOR DETECTING RUPTURES IN DRILL PIPE ABOVE AND BELOW THE DRILL COLLAR

[76] Inventor: Jack L. Polley, P.O. Box 888, 14 E. Second, Hutchinson, Kans. 67501

[21] Appl. No.: 423,863

[22] Filed: Sep. 27, 1982

[51] Int. Cl.$^3$ .............................................. E21B 12/00
[52] U.S. Cl. ....................................... 166/155; 285/3; 285/18; 137/68 R; 137/71; 137/533.11; 73/40.5 R
[58] Field of Search .................. 175/48; 166/250, 317, 166/322, 155, 156; 137/68 R, 71, 533.11; 73/40.5 R, 49.1, 155; 285/3, 4, 13, 14, 18

[56] References Cited

U.S. PATENT DOCUMENTS

| | | | |
|---|---|---|---|
| 2,216,268 | 10/1940 | Fritsche | 166/250 X |
| 2,330,267 | 9/1943 | Burt | 137/71 |
| 2,627,317 | 2/1953 | Baker | 166/128 |
| 2,998,075 | 8/1961 | Clark | 166/155 |
| 3,051,244 | 8/1962 | Litchfield | 166/317 |
| 3,105,378 | 10/1963 | Darling | 73/40.5 R |
| 3,180,420 | 4/1965 | Manson | 166/317 X |
| 3,523,580 | 8/1970 | LeBourg | 166/319 |
| 4,182,159 | 1/1980 | Churchman | 73/40.5 R |
| 4,299,281 | 11/1981 | Long | 166/156 X |
| 4,322,969 | 4/1982 | Ball | 73/40.5 R |

FOREIGN PATENT DOCUMENTS

| | | | |
|---|---|---|---|
| 732500 | 5/1980 | U.S.S.R. | 166/317 |

*Primary Examiner*—Ernest R. Purser
*Assistant Examiner*—Timothy David Hovis
*Attorney, Agent, or Firm*—John H. Widdowson

[57] ABSTRACT

An apparatus for detecting ruptures in a drill pipe above and below the drill collar comprising a nose cone, a lower body threadably engaged to the nose cone. The lower body has a structure defined by a plurality of circulation by-pass apertures and shear pin apertures. A cylinder actuator having actuator apertures is installed within the lower body juxtaposed to the shear pin apertures. Shear pins slideably lodge through the shear pin apertures of the lower body into the actuator apertures of the cylinder actuator. A steel ball seats on top of the cylinder actuator. An upper body threadably engages the lower body and a retrieval cap threadably engages the upper body. The apparatus seats into a seating sub in operation of the invention. The method of detecting and correcting ruptures in a drill pipe above and below the drill collar to prevent loss of drill mud comprises running a seating sub in the drill string at the top of the drill collar and subsequently dropping a washout locator tool into the drill pipe until the tool seats in the seating sub. The drill string is pressurized above the seated tool to a predetermined pressure. The predetermined pressure is monitored to ascertain whether or not the predetermined pressure holds without bleeding off, indicating that there is no noticeable leak in the drill string between the tool and the surface, or doesn't hold and bleeds off indicating that there is a leak. If the pressure holds without bleeding off, shearing pins are sheared in the tool to establish circulation and the drill stern is pulled dry and the bottom hole assembly below the drill collar is checked. When the pressure does not hold, the drill string is pulled in order to detect and correct any ruptures which cause the decrease in the predetermined pressure.

4 Claims, 9 Drawing Figures

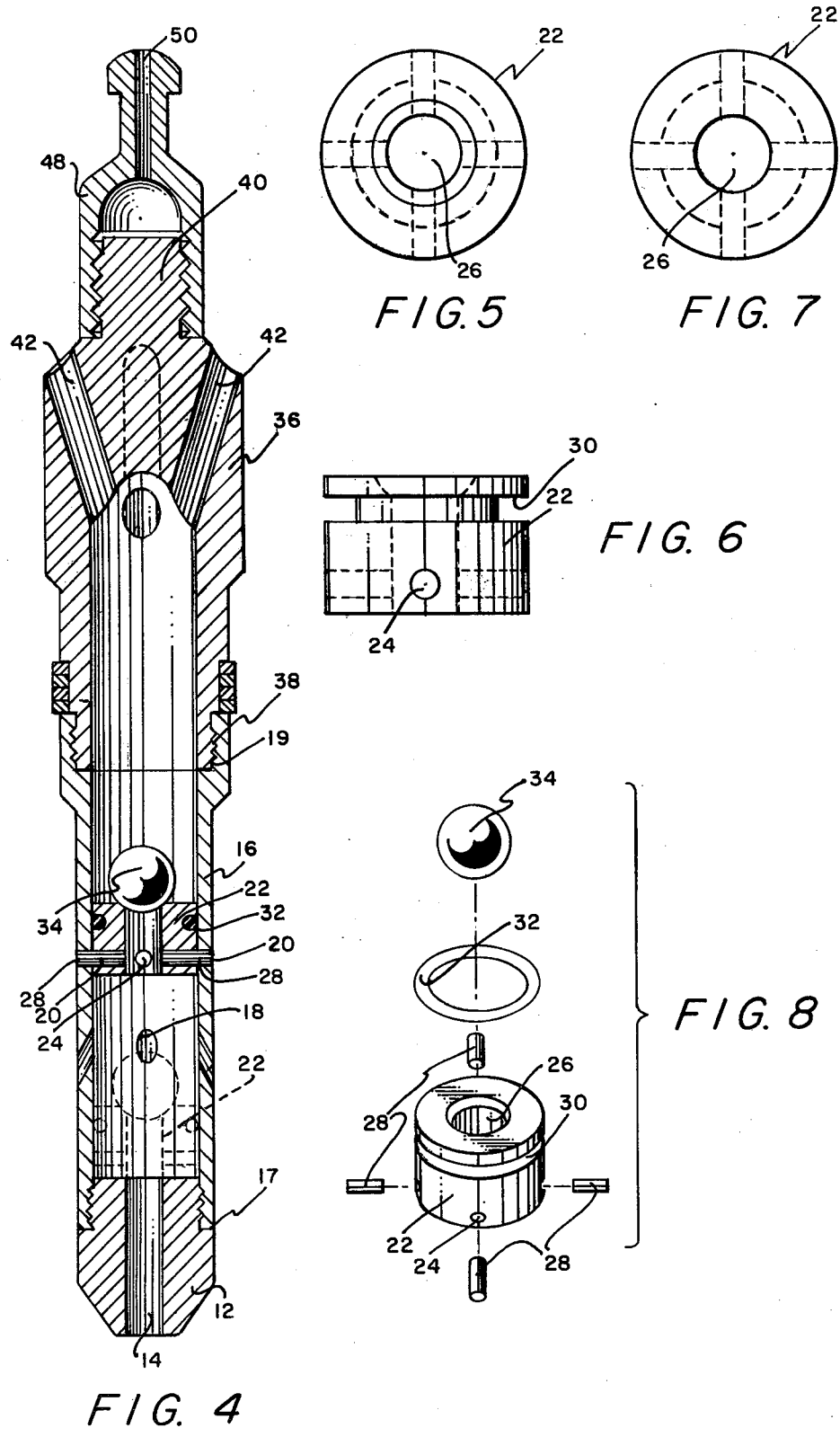

APPARATUS FOR DETECTING RUPTURES IN DRILL PIPE ABOVE AND BELOW THE DRILL COLLAR

BACKGROUND OF THE INVENTION

1. Field of the Invention

This invention relates to an oil field tool for detecting ruptures. More specifically, this invention provides an apparatus and method for detecting ruptures in drill pipe above and below the drill collar.

2. Description of the Prior Art

U.S. Pat. No. 1,955,113 by Davenport discloses a testing shoe for well casing. U.S. Pat. No. 3,523,580 by Lebourg teaches a tubing tester wherein the tester may be lowered into the well for testing the tubing. U.S. Pat. No. 2,963,092 by Anderson et al discloses a testing tool for tubing to determine leaks at a point within the length of the tubing. U.S. Pat. No. 2,955,458 by Sonnier et al also discloses a tubing tester plug for use in wells. Additional prior art is found in U.S. Pat. No. 4,083,230 by Rome, Sr. et al, U.S. Pat. No. 4,260,021 by Mott, and U.S. Pat. No. 4,299,281 by Long et al. None of the foregoing prior art teaches or suggests the specific oil field tool and method of this invention which is for the purpose of detecting ruptures in drill pipe above and below the drill collar in order to correct such ruptures to prevent loss of drilling mud.

SUMMARY OF THE INVENTION

This invention accomplishes its desired objects by providing an oil tool or apparatus for detecting ruptures in a drill pipe above and below the drill collar and a method of detecting and correcting such ruptures to prevent loss of drilling mud. The apparatus comprises a nose cone and a lower body threadably engaged to the nose cone. The lower body has a structure defined by a plurality of circulation by-pass apertures and shear pin apertures. A cylinder actuator having actuator apertures is installed within the lower body juxtaposed to the shear pin apertures. Shear pins slideably lodge through the shear pin apertures of the lower body into the actuator apertures of the cylinder actuator. A steel ball seats on top of the cylinder actuator. An upper body threadably engages the lower body and a retrieval cap threadably engages the upper body. The apparatus seats into a seating sub in operation of the invention. The method of detecting and correcting ruptures in a drill pipe above and below the drill collar to prevent loss of drilling mud comprises running a seating sub in the drill string at the top of the drill collar and subsequently dropping a washout locator tool into the drill pipe until the tool seats in the seating sub. The drill string is pressurized above the seated tool to a predetermined pressure. The predetermined pressure is monitored to ascertain whether or not the predetermined pressure holds without bleeding off, indicating that there is no noticeable leak in the drill string between the tool and the surface, or doesn't hold and bleeds off indicating that there is a leak. If the pressure holds without bleeding off, shearing pins are sheared in the tool to establish circulation and the bottom hole assembly below the drill collar is checked. If the pressure does not hold, the drill string is pulled in order to detect and correct any ruptures which cause the decrease in the predetermined pressure.

It is an object of the invention to provide an apparatus and method for detecting ruptures in drill pipe above and below the drill collar in order to correct such ruptures to prevent loss of drilling mud.

It is another object of the invention to provide a method for detecting ruptures in drill pipe above and below the drill collar in order to correct such ruptures to prevent loss of drilling mud and an apparatus for same which is relatively inexpensive to manufacture, can be easily transported, and can be easily utilized in a drilling operation if the driller suspects a washout in the drill pipe, or in the bottom hole assembly due to a surface pressure loss.

These together with various ancillary objects and features, will become apparent as the following description proceeds, are attained by this invention preferred embodiments being shown in the accompanying drawings, by way of example only, wherein:

BRIEF DESCRIPTION OF THE DRAWINGS

FIG. 4 is a vertical sectional view taken in direction of the arrows and along the plane of line 4—4 in FIG. 3;

FIG. 5 is a top plan view of the cylinder actuator;

FIG. 6 is a side elevational view of the cylinder actuator;

FIG. 7 is a bottom plan view of the cylinder actuator;

FIG. 8 is a segmented perspective view of the cylinder actuator, O-ring seal, steel ball, and shear pins assembly.

DETAILED DESCRIPTION OF THE INVENTION

Figure 1:
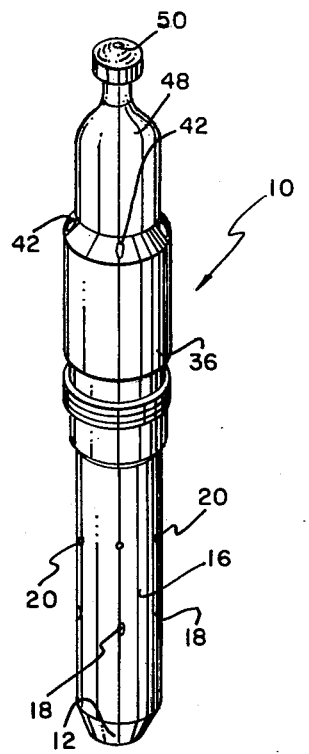
FIG. 1 is a perspective view of the apparatus of the invention.

Referring in detail now to the drawings, wherein like reference numerals indicate similar parts throughout the various views, there is seen the tool or device generally illustrated as 10 for detecting ruptures in a drill pipe above and below the drill collar. The device 10 has a nose cone 12 which includes a longitudinal bore 14. A lower cylindrical hollow body 16 has an end 17 threadably engaged to the nose cone 12. Lower body 16 with ends 17 and 19 has a structure represented by a plurality of circulation by-pass apertures 18 and shear pin apertures 20. By-pass apertures 18 are positioned between end 17 and shear pin apertures 20.

A cylinder actuator 22, having a plurality of cylindrical actuator apertures 24 and a longitudinal bore 26, is installed within the lower body 16 by registering the actuator apertures 24 of the actuator 22 with the shear pin apertures 20 of the lower body 16 and inserting a plurality of shear pins 28 into and through the shear pin apertures 20 and into the actuator apertures 24. Actuator 22 additionally includes an actuator groove 30 circumscribing the outside thereof and an O-ring seal 32 positioned within the actuator groove 30 to make a seal between the lower body 16 and the actuator 22.

A steel ball 34 seats over one end of the actuator bore 26 (see FIG. 4) to function as a check valve in allowing mud to flow up through the device 10 but not down.

An upper cylindrical hollow body 36 has threaded male ends 38 and 40. End 38 threadably engages to end 19 of the lower body 16. Upper body 36 has a structure in the top thereof defined by a plurality of upper body apertures 42 which allow the exterior surroundings of the upper body 36 to communicate with the hollow inside thereof.

Figure 2:
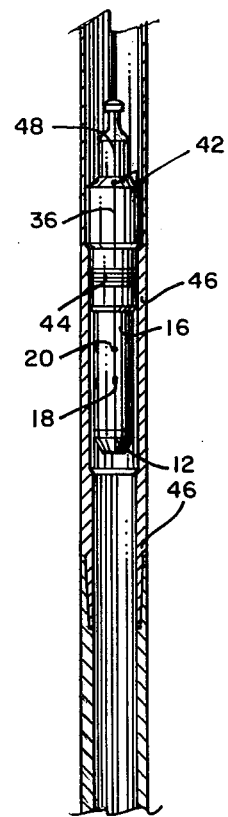
FIG. 2 is a vertical sectional view of a plug seating sub having the apparatus of this invention seated therein.
Figure 3:
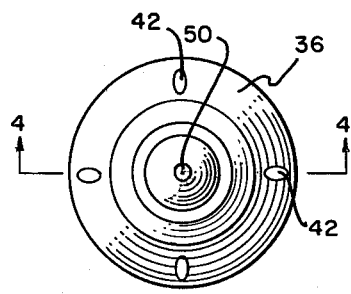
FIG. 3 is a top plan view of the invention.
Figure 9:
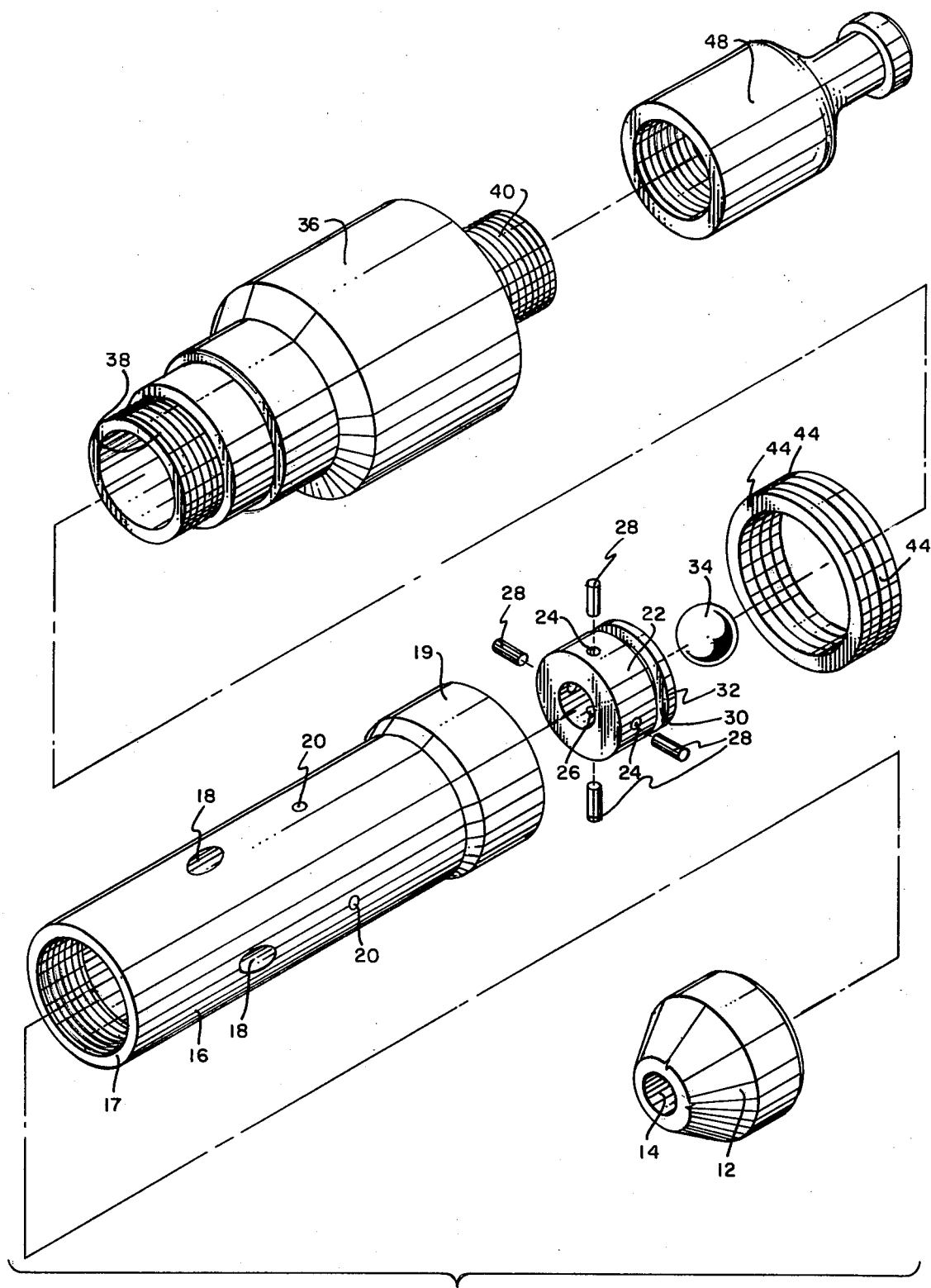
FIG. 9 is an exploded segmented perspective view of the apparatus of this invention.

A plurality of U-cup seals 44 is slidably positioned on the upper body 36 in proximity to end 38 for making a seal between a plug seating sub 46 (see FIG. 2) and the device 10.

A hollow retrieval cap 48 threadably engages to end 40 of upper body 36 and has a longitudinal bore 50 extending through the top thereof.

The shear pins 28 are preferably manufactured from brass or steel. I have found that with four 3/16 inch brass pins 28, the pins 28 will shear at 1750 P.S.I. With three 3/16 inch brass pins 28 and one 3/16 inch steel pin 28, the pins 28 will shear at 2500 P.S.I. With two 3/16 inch brass and two 3/16 steel pins 28, shearing will occur at 3250 P.S.I.

With continuing reference to the drawings for operation of the invention, the tool 10 is designed to establish if surface pressure loss in drilling fluid is due to washout in the drill pipe. It is designed not to restrict the drill string inside diameter, to be fully retrievable in case of a tight hole problem, and can be circulated through after the pipe has been pressure tested. The plug seating sub 46 is to be run in the drill string at the top of the drill collars during normal drilling operations. If the driller suspects a washout in the drill pipe or in the bottom hole assembly due to a surface pressure loss, the washout tool 10 is dropped into the drill pipe and circulated down by the kelly until it seats in the sub 46. Subsequently, the drill string pipe is pressurized to a predetermined pressure (e.g. 1000 P.S.I.) and then held for a given length of time. The pressure is monitored and if the pressure holds, the washout is below the tool 10 and drill pipe has no leaks. There is no need to pull the drill pipe wet. The pressure is built up in the drill string pipe until the pressure on top of the actuator 22 shears the pins 28. This allows pulling of empty pipe for bottom hole assembly repair below the drill collar. The washout locator 10 can be retrieved on the trip out or with drill wireline. If, however, the pressure is not held and the pressure drops, the washout is in the surface equipment, or the drill pipe. If the surface equipment is OK, the drill pipe is rechecked with the washout locator 10 in place to determine that the leak is in the drill pipe. While the locator 10 is in place, the drill pipe is pulled one section at a time and each strand of pipe is checked. This is continued until the drill pipe washout is located. The damaged pipe is replaced and the drill string is subsequently pressurized again to insure no other drill pipe is damaged. If the pressure holds, the pressure is increased until the shear pins 28 are sheared dropping the actuator means 22 below the by-pass apertures 18 (as evidenced in FIG. 4) to allow circulation through the tool 10. The locator or tool 10 is then retrieved with a wireline tool, and normal drilling operations are continued.

My invention will be illustrated by the following examples:

EXAMPLE I

Drilling at 12,560 feet measured depth, deviated hole angle of 62 degrees and a pump pressure of 3250 P.S.I. 5 inch drill pipe, 40 joints of heavy weight drill pipe and 6×8 drill collars with stabilizers. A drill pipe washout locator tool seating sub 46 is in the drill string on top of the drill collars and below the heavy weight drill pipe. Lost 200 P.S.I. of pump pressure while drilling, checked surface equipment and found no problems, broke kelly off, dropped washout locator tool 10 in the drill pipe and circulated it down with a slow pump. Tool 10 seated in sub 46 and the drill pipe was pressurized to 1200 P.S.I. and stopped the pumps. Found no bleed off, proving drill pipe was not ruptured and leaking. Subsequently, pressure was built up to 1750 P.S.I. to shear the shear pins 28 and establish circulation through tool 10 and pumped weighted mud, and pulled out of hole with dry pipe as normal practice. Found a pin crack on a stabilizer. Tool 10 saved pulling bolt pipe to check for washout in the drill pipe.

EXAMPLE II

Drilling as in Example I at 14,323 feet measured depth and had a loss of 375 P.S.I. of pump pressure. Checked surface equipment and found no problem. Broke kelly off, dropped in the washout locator 10 in the drill pipe. Put kelly on and circulated with slow pump until tool 10 seated in seating sub 46. Pressurized the drill pipe to 1000 P.S.I. and stopped pump. Pressure did not hold. Pulled drill pipe out of the well with washout locator 10 still seated and full of mud. Found mud leaking out of drill pipe in the slip area after pulling 21 strands. Laid down bad joint of pipe, put kelly back on and pressurized up the pipe to 1250 P.S.I. and pressure held steady proving the remainder of drill pipe is OK. Pressured up drill pipe and sheared pins 28 at 1750 P.S.I. Circulated for 15 minutes. Ran in with wire line catcher and retrieved washout locator 10. Ran drill string to bottom of hole and drilled ahead.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for detecting ruptures in a drill pipe above and below the drill collar comprising a nose cone means having a nose cone aperture longitudinally disposed and a threaded end;

a lower cylindrical hollow body means including a pair of threaded ends and having a structure defined by a plurality of circulation by-pass apertures and a plurality of shear pin apertures, said cone means threadably engaged to one of the pair of said threaded ends of said lower body means;

a cylinder actuator means having an actuator longitudinal bore and a structure defined by a plurality of cylindrical actuator apertures along the sides of the actuator means and communicating with the actuator bore;

a plurality of shear pin means slidably passing into and through the shear pin apertures of the lower body means and into the actuator apertures to install the cylinder actuator means into the lower body means;

a steel ball means seated over one end of said actuator bore to function as a check valve;

an upper cylindrical hollow body means having a pair of threaded ends with one end threadably engaged to one of the threaded ends of said lower body means, said upper body means having a structure defined by a plurality of upper body apertures;

U-cup seal means slidably positioned on the upper body; and a retrieval cap means having a longitudinal bore extending through the top thereof and threadably engaging said upper body means.

2. The apparatus of claim 1 wherein said circulation by-pass apertures of said lower body are positioned between said shear pin apertures and the end of said lower body which threadably engages said nose cone means.

3. The apparatus of claim 2 wherein said upper body apertures are positioned in the top of said upper body means and communicates the exterior surrounding of said upper body with the hollow inside thereof.

4. The apparatus of claim 3 wherein said actuator means additionally comprises an actuator groove circumscribing the outside thereof;

and an O-ring seal means positioned within said actuator groove.

* * * * *